US005481755A

United States Patent [19]

Harper et al.

[11] Patent Number: 5,481,755

[45] Date of Patent: Jan. 2, 1996

[54] APPARATUS AND METHOD FOR ADDRESSING MULTIPLE ADAPTER CARDS IN ONE OPERATION BY DISTRIBUTING BITS OF REGISTERS ACROSS THE ADAPTER CARDS

[75] Inventors: Jeffrey D. Harper, Austin, Tex.; Paul W. Kalendra; William J. Piazza, both of Boca Raton, Fla.; Howard C. Tanner; Anh Vinh, both of Austin, Tex.

[73] Assignee: International Business Machines Corporation, Armonk, N.Y.

[21] Appl. No.: 236,672

[22] Filed: May 2, 1994

Related U.S. Application Data

[63] Continuation of Ser. No. 906,048, Jun. 26, 1992, abandoned, which is a continuation of Ser. No. 525,509, May 18, 1990, abandoned.

[51] Int. Cl.$^{6}$ .......................... G06F 13/00; G06F 12/00; G06F 12/02

[52] U.S. Cl. .......................... 395/823; 395/310; 395/162; 362/DIG. 1; 362/239.9; 362/247; 362/247.2

[58] Field of Search .................................. 395/275, 162, 395/823, 824, 310; 358/22; 345/187

[56] References Cited

U.S. PATENT DOCUMENTS

| | | | |
|---|---|---|---|
| 3,728,693 | 4/1973 | Macker et al. | 364/200 |
| 4,373,181 | 2/1983 | Chisholm et al. | 395/275 |
| 4,438,432 | 3/1984 | Hurcum | 340/825.35 |
| 4,703,420 | 10/1987 | Irwin | 364/200 |
| 4,704,697 | 11/1987 | Kiremidjian et al. | 340/717 |
| 4,757,441 | 7/1988 | Buckland et al. | 340/717 |
| 4,849,931 | 7/1989 | Ishii et al. | 395/275 |
| 4,958,915 | 9/1990 | Okaka et al. | 350/345 |
| 4,965,559 | 10/1990 | Dye | 340/717 |

OTHER PUBLICATIONS

"IBM Enhanced Graphics Adapter" pp. 1–75 Aug. 2, 1984.

*Primary Examiner*—Thomas C. Lee
*Assistant Examiner*—D. Dinh
*Attorney, Agent, or Firm*—Anthony N. Magistrale; William N. Hogg

[57] ABSTRACT

A register distributed across multiple single port adapters allows the system to operate the single port adapters identically to a single multi-port adapter. Each adapter has its own priority logic identical to the logic used on a multi-port adapter to select an individual port. The priority logic on the adapter allows the system to deselect one adapter and select another adapter in one operation. Each adapter has switch settings to allow selective control of individual bits on the system bus, which allows multiple adapters to respond to the processor simultaneously for different ports in the same manner as a multi-port adapter. By replying simultaneously, the system can use the same software to control two different hardware adapter types: single port, or multi-port.

50 Claims, 3 Drawing Sheets

DIGITS 3, 2, 1, AND 0 REPRESENT THE 4 SECTIONS OF THE MULTIPORT ADAPTER

REGISTER ADDRESS

8200

8201

8203/8202

3 2 1 0

PIGGYBACK CARD ID

8204

UNUSED 3 2 1 0

VIDEO PORT SELECT

8206/8205

3 2 1 0

LCD CONTRAST SETTING

8207

APPARATUS AND METHOD FOR ADDRESSING MULTIPLE ADAPTER CARDS IN ONE OPERATION BY DISTRIBUTING BITS OF REGISTERS ACROSS THE ADAPTER CARDS

This is a continuation of application Ser. No. 07/906,048 filed on Jun. 26, 1992, now abandoned, which is a continuation of application Ser. No. 07/525,509 filed on May 18, 1990, now abandoned.

CROSS-REFERENCE TO RELATED APPLICATIONS

This application is related to the commonly owned copending application entitled "High Function Interface to Video Features", filed May 18, 1990, bearing U.S. Ser. No. 07/525,510, now abandoned, and naming W. J. Piazza, one of the named inventors herein, as sole inventor, the contents of which is specifically incorporated by reference herein in its entirety.

BACKGROUND TO THE INVENTION

1. Technical Field

This invention relates to adapter cards for computer systems. In particular, this invention relates to selection and control of multiple adapter cards within a system.

2. Background Art

In the early days of personal computer systems, the number of peripheral devices attached to a system tended to be small. The systems typically would include a video display, a printer, a disk drive, and perhaps a modem. To control communication between the processor and the peripheral devices, each device was assigned a specific port address (hereafter, port). Adapter cards (hereafter adapters) were used to interface between the processor and each device, and were typically developed to control a single port.

The processor could select a port by placing the port address on the system bus which connected the processor to the other devices in the system. The adapter, which provided the interface between the device and the system bus, would recognize the address and initiate the action directed by the processor. When the processor switched from one device to another, the original device would be deselected by the processor in one bus write operation and then the new device would be addressed by the processor in a second write operation. Typically, each device was controlled by different software because of the differences in the hardware (e.g., printers and modems would each have unique software).

Over time, processors became more powerful, and were able to control many more devices in a system. As the number of peripheral (I/O) devices on a system grew, a plurality of identical devices were often used on the same system. For example, systems applications developed which used multiple video displays instead of the single displays typically found on early computers. Further, adapter technology improved to the point where multiple video ports could be controlled by a single adapter. One result of the improvement of technology in adapters was the situation where multiple types of adapters were used to control a plurality of identical devices. For example, a system which had a single video display with a single port adapter would be expanded to include several additional displays. The displays may have been added one at a time with each having its own adapter. Likewise, several displays may have been added at the same time with a single multi-port video adapter. Therefore, depending on the rate of growth and the timing of the additions to the system, different types of adapters may be used on the same system to control identical displays.

This creates a problem for the software in at least two respects. First, the software may not be compatible with the two types of adapter hardware which would require two versions of software to control identical I/O devices on the same system. Second, there is a performance impact due to the multiple bus writes required to deselect one device and to select another. The compatibility problem also exists in a multi system environment when one system has a single multi-port adapter and a second system has grown from a single device/single port adapter system to multiple devices each having a single port adapter. In that situation, each system would require different software to control the adapters even though the I/O device configuration may be identical (i.e., four displays on a single multi-port adapter in system A and four identical displays on four single port adapters in system B).

In summary, due to the increase in the power and complexity of computers, systems have developed performance problems relating to selection and control of the larger number of I/O devices. In addition, software compatibility problems exist due to the difference in adapter types used on the same system or due to differences in adapter types used in a multisystem environment.

SUMMARY OF THE INVENTION

An object of this invention is to switch active adapter ports with a single operation.

Another object of this invention is to control multiple adapters in a single operation.

Yet another object of this invention is to simultaneously place information on the bus from multiple adapters.

A further object of this invention is to use a distributed register to control backlight and contrast on LCD panels.

Still another object of this invention is to control multiport adapter cards and multiple single port adapter cards with the same software.

The foregoing and other objects, features and advantages of the invention are achieved by distributing some of the addressable registers used by multi-port adapters across multiple single port adapters. Specific bus bit lines assigned to each of the single port adapters correspond with register locations assigned to each port, thereby allowing the simultaneous response of multiple single port adapters to place the same response on the bus as a single multi-port adapter.

DESCRIPTION OF THE PREFERRED EMBODIMENT

By way of general description, in a computer system with multiple displays, a register is provided in multi-port adapters which allows the system to activate one display and deactivate another simultaneously. This is accomplished by merely writing to the register. The contents of the register are then used by the adapter to determine which display to deactivate and which display to activate. In like manner, the processor can request status from all of the displays attached to the adapter. Or it can adjust backlighting or contrast for the displays in a single write operation. (In practice, the register can be organized as a single register or as multiple registers. For ease of illustration, it will be treated as a single register herein.) The register in the multi-port adapter enables this single write operation by assigning specific bits in the register to specific display ports.

In a configuration which contains multiple single port adapters, the register is distributed across each of the adapters. By assigning specific bits to each adapter, the processor is able to communicate with multiple single port adapters in the same manner as it communicates with a single multi-port adapter. Each adapter has a switch to indicate which port position it has, which allows it to select the appropriate bits from the bus to place in its register. Also, the switch setting allows each adapter to select the appropriate bus bit lines when replying to the processor. Because the processor is communicating with the displays through a register, and because the processor cannot distinguish the distributed register from the single register on the multi-port card, the processor can communicate with multiple single port adapters in a single operation just as it does with a single multi-port adapter. Therefore, the type of adapter used is transparent to the system software.

A very unique feature of the single port adapters is that distributing the registers across multiple adapters provides better system performance and maintains software compatibility with the multi-port version of the adapter. In other words, on the multi-port adapter, writing to the distributed register allows software to deselect one video port and to select a different video with one write operation because all four video ports are implemented on the same card. But the same capability exists to deselect one port and select another port when using one port cards, even though the operation involves multiple adapter cards.

Figure 1:
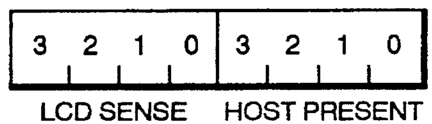
FIG. 1 shows a sample distributed register configuration.
Figure 1:
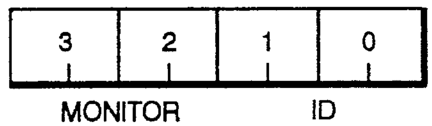
Figure 1:
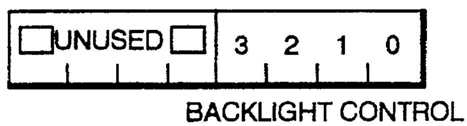

In FIG. 1, the register fields are shown. For ease of illustration, the register will be referred to as a distributed register whether it is distributed across several adapters or located on a single multi-port adapter. In either case it will function identically from the perspective of the system. The single and multi-port video adapters contain a set of addressable hardware registers (for illustation, in the range 8200h through 8207h). These registers are unique to these adapters (i.e., they are not found on normal video adapters.) They implement the functions of selecting one of four video "ports" to be active (i.e., addressable for updating), sensing the capabilities of a particular video port, and controlling the backlight and contrast of the LCD panels. In addition, the registers can be expanded to control any of the functions on a display which a processor may control in other systems. The numbers 0, 1, 2, and 3 differentiate between four sets of hardware. The video port select field allows the processor to select the desired display by turning on the appropriate bit. For example, the processor can select port 2 and then read the video memory from that port. Control fields for other activity can also be provided. As an example, sophisticated adapters often use piggyback, or daughter, cards to hold additional logic. The piggyback card ID field allows the processor to select and control these daughter cards as well.

As a further example, reading register 8207h on the multi-port adapter allows software to determine which backlights are currently turned on and which are not. On the multi-port adapter, this read operation simply involves gating the four signals to the system bus at the appropriate time, because all four backlights are controlled by this one adapter and therefore they are all available to be gated through a single circuit. However, reading register 8207h will produce the same results when one or more single port video adapters are in the system. In this case, each adapter individually gates only one bit of data onto the system bus, thus providing the response for the video port which it controls. Nonetheless, the system sees the response from all installed video ports simultaneously. The registers are therefore distributed across multiple adapters.

Figure 2:
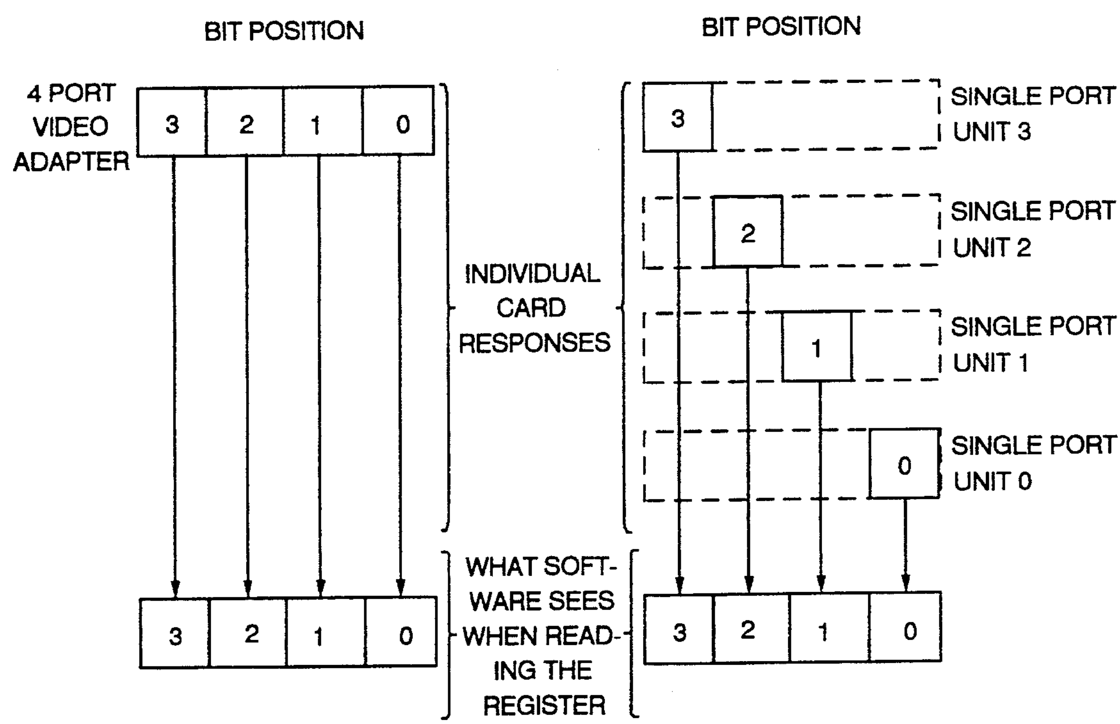
FIG. 2 shows a diagram of the distributed register used in a multiple single adapter configuration and the corresponding register in a multi-port adapter configuration.

In FIG. 2, bus bit line attachment of a distributed register configuration and a multi-port configuration are illustrated. In the multi-port configuration, the adapter presents information and accepts commands for four displays (0–3) simultaneously. In the distributed configuration, each adapter controls a particular bit for the port address of the display it controls. Since each adapter can write to its particular bus bit line simultaneously with the other adapters, the four distributed adapters (0–3) can appear to the system identically to the multi-port adapter when the system reads or writes to the bus.

Each single port adapter has priority selection means (not shown) identical to that on multi-port adapters. Priority selection of adapters is well known in the art. Further each port has means to activate a single bit line on the bus simultaneously with other single port adapters each of which addresses a different bit line. The priority selection means recognizes the highest priority address to be used and activates its port if that address is assigned to its port or deactivates its port if a higher priority address assigned to a different port is selected. Therefore, the system is protected from physical damage in the event that the activation of more than one non-distributed register is attempted. The assignment of specific bus bit lines to each of the single port adapters which correspond with register locations assigned to each port allows the simultaneous response of multiple single port adapters to place the same response on the bus as a single multi-port adapter.

Note that a priority encoding circuit is contained on the multi-port video adapter so that only one of the four video ports will be selected if more than one bit is accidently turned on when writing to register 8204h. The same priority encoding scheme also works when more than one single port video adapter is installed, because each adapter applies the same priority encoding algorithm (in hardware) to determine which is the highest priority port being selected. If this selected port matches the adapter's own unit number it considers itself in control of the bus, otherwise it remains inactive.

Figure 3:
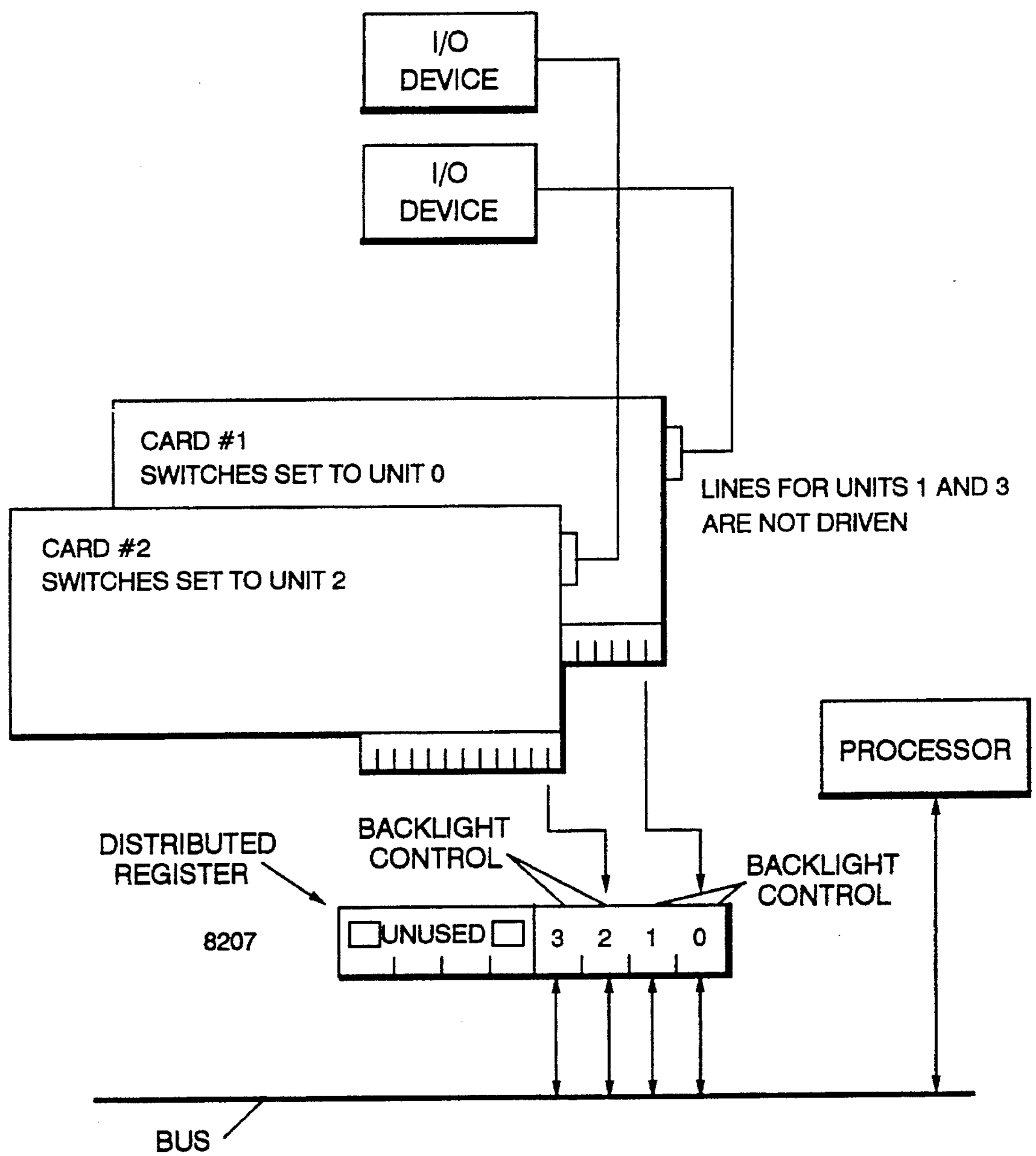
FIG. 3 shows a configuration with two single port adapters.

In FIG. 3, a configuration showing two single port adapters is shown. The adapter switches were arbitrarily chosen to select port addresses 0 and 2. A system can be gradually enlarged, as needed, from one to four adapters.

This invention improves performance and ease of programming by allowing the same set of functions (selecting and deselecting video ports, controlling backlights, etc.) to be accomplished with fewer operations to the hardware. In addition, it improves software compatibility. Applications written for a system based on a single video display (such as an application written for a traditional single display system) can be easily transported to a system having multiple video displays. Traditional approaches used in the past to address the problems associated with having more than one of the same hardware function available within the system have been to provide each set of hardware with its own unique address (which uses up available address space quicker and has more impacts to software), and to provide a register within the system which completely disables one set of hardware and enables another, but does not allow for simultaneous control of both (this has a performance penalty associated with it).

While this invention has been described in terms of a preferred embodiment, those skilled in the art will recognize many variations which can be made without departing from the spirit and scope of the invention. For example, a four port multi-port adapter was used for illustrative purposes, but the number of ports and corresponding number of single port adapters on the distributed register can be varied. In addition, the types of display operations shown, such as backlight, and contrast control, could be expanded to other display functions. The address switching means could be accomplished by common hardware switches or, for example, eproms. Bus bit line selection logic and device priority logic could be implemented in hardware or software on the adapter. Therefore, the invention should be limited only by the scope of the claims.

We claim:

1. An apparatus for separately controlling a plurality of separately addressable I/O devices in a system, and wherein each of said I/O devices has functions which are independently controllable with respect to other I/O devices; said apparatus comprising:

at least one adapter interconnecting said system and each of said I/O devices, each adapter further comprising:

switch selection means to indicate to each respective adapter the address associated with each I/O device connected thereto;

a plurality of distributed registers, each associated with a different one of said functions, each one of said distributed registers associated with and distributed among all of said adapters and having a single system address for all of said adapters associated with said distributed register for receiving information in a single operation from a system bus relating to one of the functions of each I/O device addressed by said single system address in said single operation, each of said distributed registers being comprised of at least one bit of information from each adapter and said at least one bit of information being operative to control one of said functions of each I/O device associated with said each adapter; and means to use said information in said distributed register for said system from said single address to communicate selectively with each of said I/O devices from said single address and control one of the functions of each I/O device independently of other I/O devices in said single operation.

2. An apparatus, as in claim 1, further comprising:

Means to select individual bus bit lines associated with a specific I/O address.

3. An apparatus, as in claim 2, further comprising:

at least one register bit location to store display contrast control information.

4. An apparatus, as in claim 2, further comprising:

at least one register bit location to store display backlight control information.

5. An apparatus, as in claim 2, further comprising:

at least one register bit location to store display status information.

6. An apparatus, as in claim 2, further comprising:

at least one register bit location to store display command information.

7. An apparatus, as in claim 2, further comprising:

at least one register bit location to store display address information.

8. An apparatus, as in claim 1, further comprising:

said system including a plurality of adapters, and means to determine when a given adapter is the highest priority adapter selected.

9. An apparatus, as in claim 8, further comprising:

Means to select individual bus bit lines associated with a specific I/O address.

10. An apparatus, as in claim 9, further comprising:

at least one register bit location to store display contrast control information.

11. An apparatus, as in claim 9, further comprising:

at least one register bit location to store display backlight control information.

12. An apparatus, as in claim 9, further comprising:

at least one register bit location to store display status information.

13. An apparatus, as in claim 9, further comprising:

at least one register bit location to store display command information.

14. An apparatus, as in claim 9, further comprising:

at least one register bit location to store display address information.

15. An apparatus for separately controlling a plurality of separately addressable I/O devices in a system; said apparatus comprising:

a processor;

a system bus, said bus operatively connected to said processor;

a plurality of separately addressable I/O devices which have functions which are independently controllable with respect to other I/O devices;

at least one adapter, each adapter operatively connected to said bus and to at least one I/O device, all of said adapters further comprising:

switch selection means to indicate to each respective adapter the address associated with each I/O device connected thereto;

said adapters having a plurality of distributed registers, each associated with a different one of said functions, each one of said distributed registers associated with and distributed among all of said adapters and having a single system address for all of said adapters associated with said distributed register for receiving information in a single operation from a system bus relating to one of the functions of each I/O device addressed by said single system address in said single operation, each of said distributed registers being comprised of at least one bit of information from each adapter and said at least one bit of information being operative to control one of said functions of each I/O device associated with said each adapter; and, means to use said information in said distributed register from said single address for said system to communicate with each of said I/O devices from said single address and control one of the functions of each I/O device independently of other I/O devices in said single operation.

16. An apparatus, as in claim 15, further comprising:

a plurality of single port adapters; and a plurality of I/O devices, each of said I/O devices associated with a respective adapter port.

17. An apparatus, as in claim 16, further comprising:

means to select individual bus bit lines associated with a specific I/O address.

18. An apparatus, as in claim 17, further comprising:

at least one register bit location to store display contrast control information.

19. An apparatus, as in claim 17, further comprising:

at least one register bit location to store display backlight control information.

20. An apparatus, as in claim 17, further comprising:

at least one register bit location to store display status information.

21. An apparatus, as in claim 17, further comprising:

at least one register bit location to store display command information.

22. An apparatus, as in claim 17, further comprising:

at least one register bit location to store display address information.

23. An apparatus, as in claim 16, further comprising:

means to determine when a given I/O device is the highest priority I/O device selected.

24. An apparatus, as in claim 23, further comprising:

means to select individual bus bit lines associated with a specific I/O address.

25. An apparatus, as in claim 24, further comprising:

at least one register bit location to store display contrast control information.

26. An apparatus, as in claim 24, further comprising:

at least one register bit location to store display backlight control information.

27. An apparatus, as in claim 24, further comprising:

at least one register bit location to store display status information.

28. An apparatus, as in claim 24, further comprising:

at least one register bit location to store display command information.

29. An apparatus, as in claim 24, further comprising:

at least one register bit location to store display address information.

30. An apparatus, as in claim 15, further comprising:

at least one single port adapter; and at least one multi-port adapter; and a plurality of I/O devices, each of the I/O devices associated with a respective adapter port.

31. An apparatus, as in claim 30, further comprising:

means to select individual bus bit lines associated with a specific I/O address.

32. An apparatus, as in claim 31, further comprising:

at least one register bit location to store display contrast control information.

33. An apparatus, as in claim 31, further comprising:

at least one register bit location to store display backlight control information.

34. An apparatus, as in claim 31, further comprising:

at least one register bit location to store display status information.

35. An apparatus, as in claim 31, further comprising:

at least one register bit location to store display command information.

36. An apparatus, as in claim 31, further comprising:

at least one register bit location to store display address information.

37. An apparatus, as in claim 30, further comprising:

means to determine when the adapter is the highest priority adapter selected.

38. An apparatus, as in claim 37, further comprising:

means to select individual bus bit lines associated with a specific I/O address.

39. An apparatus, as in claim 38, further comprising:

at least one register bit location to store display contrast control information.

40. An apparatus, as in claim 38, further comprising:

at least one register bit location to store display backlight control information.

41. An apparatus, as in claim 38, further comprising:

at least one register bit location to store display status information.

42. An apparatus, as in claim 38, further comprising:

at least one register bit location to store display command information.

43. An apparatus, as in claim 38, further comprising:

at least one register bit location to store display address information.

44. A method for controlling a plurality of separately addressable I/O devices in a system and wherein each of said I/O devices has functions which are independently controllable with respect to the other I/O devices; said method including the steps of:

providing at least one adapter;

providing a plurality of distributed registers, each associated with a different one of said functions, each one of said distributed registers associated with and distributed among all of said adapters and having a single system address for all of said adapters associated with said distributed register to receive information in a single operation relating to one of the functions of said I/O devices, each of said distributed registers being comprised of at least one bit of information from each adapter and said at least one bit of information being operative to control one of said functions of each I/O device associated with said each adapter;

setting address selection means in all of said adapters to indicate to each of said adapters the address of an I/O device associated therewith;

sending and receiving information from a system to said distributed register in said adapters in a single operation relating to all of said I/O devices addressed by said single system address; and using said information to communicate with each of said I/O devices from said single system address in said single operation and control the functions of each I/O device independently of other I/O devices in said single operation.

45. A method, as in claim 44, including the further steps of:

selecting individual bus bit lines associated with a specific I/O address.

46. A method, as in claim 45, including the further steps of:

storing display contrast information in at least one of the register bit locations.

47. A method, as in claim 45, including the further steps of:

storing display backlight control information in at least one of the register bit locations.

48. A method, as in claim 45, including the further steps of:

storing display status information in at least one of the register bit locations.

49. A method, as in claim 45, including the further steps of:

storing display command information in at least one of the register bit locations.

50. A method, as in claim 45, including the further steps of:

storing display address information in at least one of the register locations.

* * * * *